(12) United States Patent
Katoh et al.

(10) Patent No.: US 6,678,336 B1
(45) Date of Patent: Jan. 13, 2004

(54) HIERARCHICAL TRANSMISSION DIGITAL DEMODULATOR

(75) Inventors: Hisakazu Katoh, Tokyo (JP); Akinori Hashimoto, Tokyo (JP); Kenichi Shiraishi, Yokohama (JP); Akihiro Horii, Zama (JP); Shoji Matsuda, Machida (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/554,669

(22) PCT Filed: Nov. 30, 1998

(86) PCT No.: PCT/JP98/05379

§ 371 (c)(1), (2), (4) Date: Aug. 9, 2000

(87) PCT Pub. No.: WO99/29075

PCT Pub. Date: Jun. 10, 1999

(30) Foreign Application Priority Data

Nov. 28, 1997 (JP) .............................................. 9/341870

(51) Int. Cl.[7] .............................................. H04L 27/06
(52) U.S. Cl. ...................................... 375/316; 375/324
(58) Field of Search ................................. 375/316, 261, 375/227, 327, 324, 329

(56) References Cited

U.S. PATENT DOCUMENTS

| | | | | |
|---|---|---|---|---|
| 4,835,790 A | * | 5/1989 | Yoshida et al. .............. 375/227 |
| 5,157,694 A | * | 10/1992 | Iwasaki et al. .............. 375/327 |
| 5,301,206 A | * | 4/1994 | Ishigaki et al. .............. 374/141 |
| 5,363,375 A | * | 11/1994 | Chuang et al. .............. 370/332 |
| 5,363,408 A | * | 11/1994 | Paik et al. .................... 375/261 |
| 5,555,275 A | * | 9/1996 | Oshima ....................... 375/261 |
| 5,646,935 A | * | 7/1997 | Ishikawa et al. ............. 370/207 |
| 5,886,748 A | * | 3/1999 | Lee ............................. 348/614 |

FOREIGN PATENT DOCUMENTS

| | | |
|---|---|---|
| JP | 55-6965 | 1/1980 |
| JP | 63-234759 | 9/1988 |
| JP | 5-145588 | 6/1993 |
| JP | 5-327807 | 12/1993 |
| JP | 9-321813 | 12/1997 |

\* cited by examiner

Primary Examiner—Temesghen Ghebretinsae
(74) Attorney, Agent, or Firm—Eric J. Robinson; Robinson Intellectual Property Law Office, P.C.

(57) ABSTRACT

A hierarchical transmission digital demodulator capable of stable sync capture and stable demodulation through setting of a demodulation operation in accordance with a reception C/N value. A CNR measuring circuit receives a demodulation output from an arithmetic circuit and measures a reception C/N value. During a period until sync is captured, a carrier is reproduced in accordance with the demodulation output that a modulated wave in a header section and a modulated wave of burst symbol signal. After sync is captured, at an intermediate C/N value the carrier is reproduced in accordance with the demodulation output of the header section, burst symbol signal and QPSK signal and in accordance with output from a logical gate circuit, and at high and low C/N values the carrier is reproduced by setting high a carrier reproduction loop gain of a gain control circuit in accordance with a signal from the logical gate circuit.

3 Claims, 10 Drawing Sheets

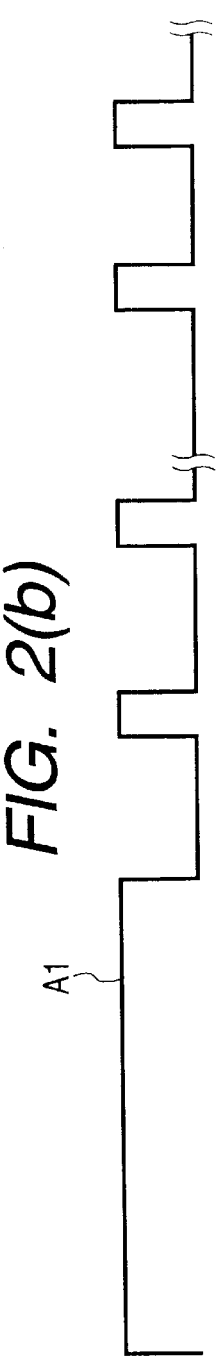
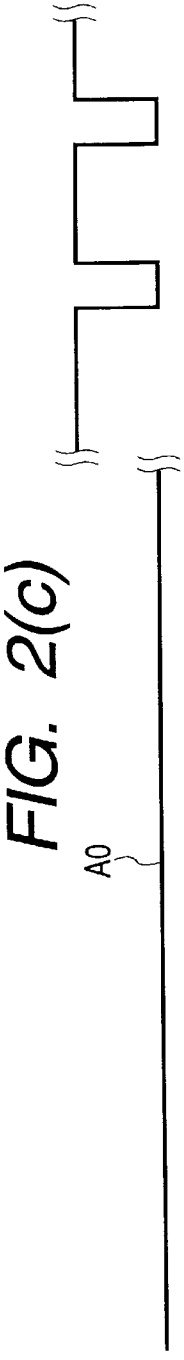
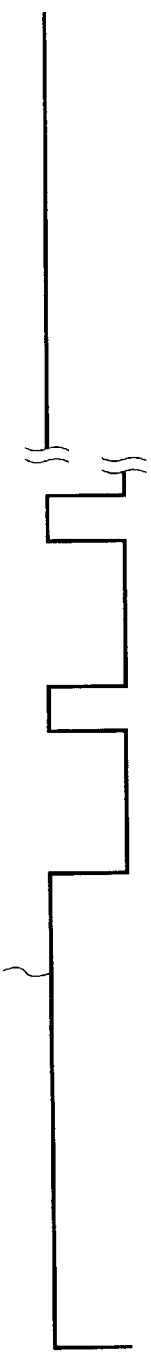
FIG. 2(a)
FIG. 2(b)
FIG. 2(c)
FIG. 2(d)

FIG. 4

| TRANSMISSION MODE | HIERARCHICAL COMBINATION |
|---|---|
| 00 | 8PSK |
| 01 | QPSK |
| 10 | 8PSK+QPSK |
| 11 | 8PSK+BPSK |

FIG. 5

| DEMODULATION ROM TABLE | A1 | A0 |
|---|---|---|
| 8PSK | 0 | 0 |
| QPSK | 0 | 1 |
| BPSK | 1 | 0 |

FIG. 6

| LOOP GAIN | LOGIC |
|---|---|
| HIGH | H |
| LOW | L |

| CNR CODE | CNR RANGE |
|---|---|
| 00 | HIGH CNR≧9dB |
| 01 | 9dB>INTERMEDIATE CNR≧4dB |
| 10 | LOW CNR<4dB |

őHIERARCHICAL TRANSMISSION DIGITAL DEMODULATOR

FIELD OF THE INVENTION

The present invention relates to a hierarchical transmission digital demodulator for demodulating digital modulated waves multiplexed on a time axis by a plurality of modulation methods in which necessary C/N (ratio of carrier power to noise power) values are different.

DESCRIPTION OF THE RELATED ART

A hierarchical transmission method is known by which digital modulated waves multiplexed on a time axis by a plurality of modulation methods in which necessary C/N values, e.g., 8PSK modulation waves, QPSK modulation waves and BPSK modulation waves, are combined to form frames which are repetitively transmitted. With such a hierarchical transmission method, since BPSK modulation waves (including burst symbol signals) provide a wide lock-in range and are easy to capture sync, the sync capture is obtained by receiving the BPSK modulation waves (including burst symbol signals) and after the sync capture is obtained, sequentially input BPSK modulation signals, burst symbol signals (BPSK modulation signals), QPSK modulation signals and 8PSK modulation signals are demodulated (continuously demodulated) in the order of input signals.

However, if the reception C/N value is degraded during the continuous demodulation, the reception state of 8PSK modulation waves requiring a high necessary C/N value is degraded. Therefore, at the receivable limit C/N value of lower hierarchical QPSK or BPSK modulation waves, a carrier slip occurs in the section of 8PSK modulation waves and the frame sync of the system cannot be captured. The necessary C/N value is therefore substantially raised and the reception state becomes unstable.

It is an object of the present invention to provide a hierarchical transmission digital demodulator capable of stable sync capture and stable demodulation by setting a demodulation operation in accordance with the reception C/N value.

DISCLOSURE OF THE INVENTION

A hierarchical transmission demodulator of this invention comprises: first carrier reproducing means for reproducing a carrier in accordance with demodulation outputs that a modulated wave in a header section and a modulated wave of a burst symbol signal are demodulated means for measuring a reception C/N value; second carrier reproducing means for reproducing the carrier in accordance with continuous demodulation outputs if the measured reception C/N value after the sync capture is equal to or larger than a first predetermined threshold; third carrier reproducing means for reproducing the carrier in accordance with demodulation outputs for a hierarchical level except a high hierarchical level if the measured reception C/N value which is equal to or larger than a second threshold which is lower than the first threshold.

According to the hierarchical transmission demodulator of this invention, during the period until sync is captured, the carrier is reproduced by the first carrier reproducing means in accordance with demodulation outputs that a modulated wave in a header section and a modulated wave of a burst symbol signal are demodulated. Accordingly, the carrier can be reproduced reliably. A reception C/N value is measured by the C/N measuring means and if the reception C/N value after the sync capture is equal to or larger than the first predetermined threshold after the sync capture, the carrier is reproduced by the second carrier reproducing means in accordance with the continuous demodulation output. It is there fore possible to prevent jitters, etc. to be caused by inability of following a frequency change while the carrier is not reproduced. If the measured reception C/N value after the sync capture is equal to or larger than the second threshold which is lower than the first threshold, the carrier is reproduced by the third carrier reproducing means in accordance with demodulation outputs for a hierarchical level except a high hierarchical level.

The hierarchical transmission digital demodulator of this invention further comprises reproduction loop characteristic switching means for switching a carrier reproduction to a different carrier reproduction characteristic during carrier reproduction by the first carrier reproducing means and during carrier reproduction by the carrier reproducing means different from the first carrier reproducing means.

According to the hierarchical transmission digital demodulator of this invention, the reproduction loop characteristic is switched between different carrier reproduction characteristics during carrier reproduction by the first carrier reproducing means and during carrier reproduction by the carrier reproducing means different from the first carrier reproducing means.

BRIEF DESCRIPTION OF THE DRAWINGS

FIGS. 2(a)–2(d) shows the structure of a frame used by a hierarchical transmission method and waveforms of signals AI and AO, according to the embodiment of the invention.

FIG. 4 is a diagram showing the relation between a transmission mode and a hierarchical combination used by a transmission mode judging circuit of the hierarchical transmission digital demodulator according to the embodiment of the invention.

FIG. 5 is a diagram illustrating a demodulation ROM table of the hierarchical transmission digital demodulator according to the embodiment of the invention.

FIG. 6 is a diagram showing the relation between a loop gain and a logical value of a gain control circuit of the hierarchical transmission digital demodulator according to the embodiment of the invention.

EMBODIMENTS OF THE INVENTION

An embodiment of a hierarchical transmission digital demodulator of this invention will be described.

Figure 1:
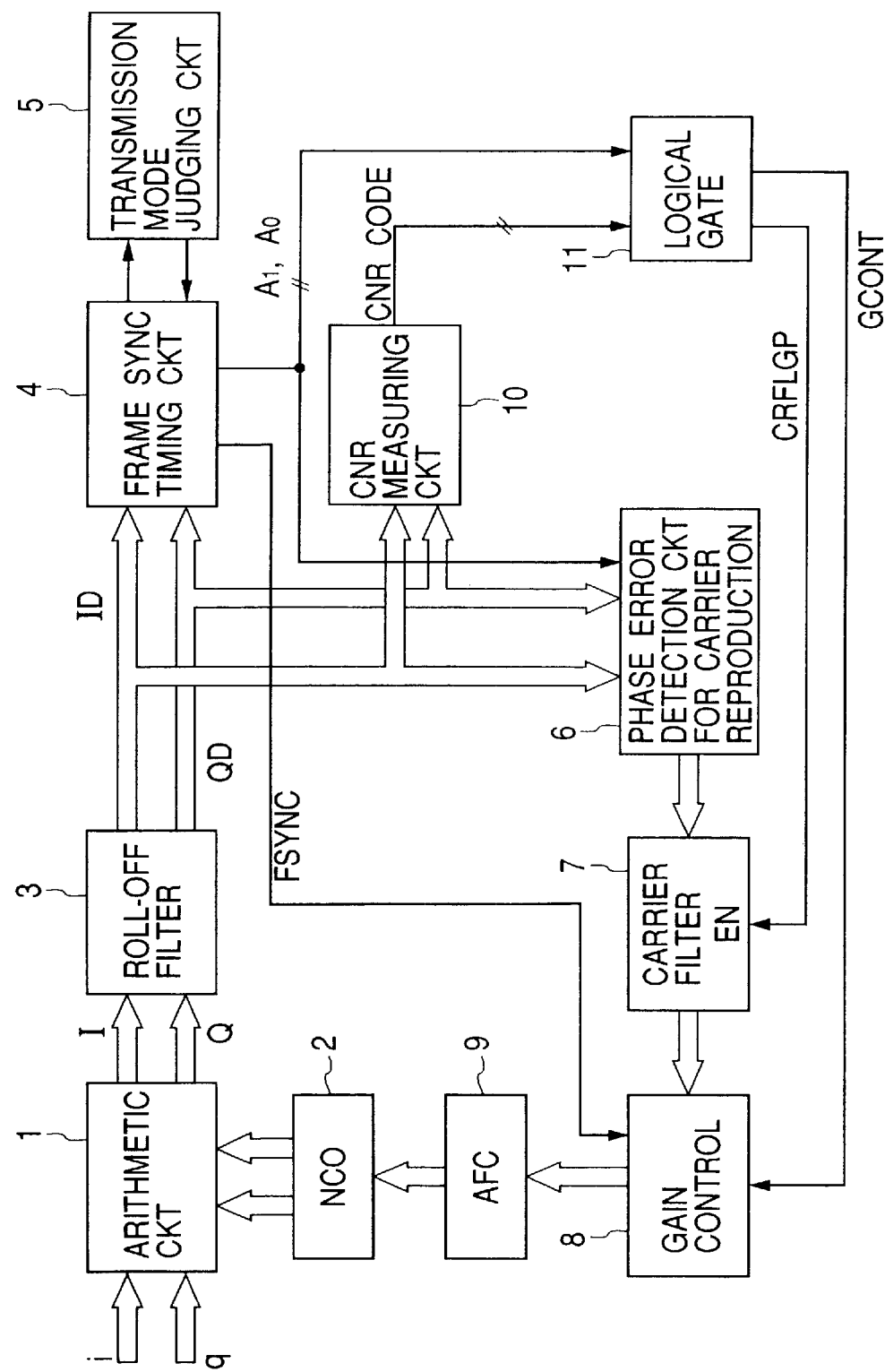
FIG. 1 is a block diagram showing the structure of a hierarchical transmission digital demodulator according to an embodiment of the invention.

FIG. 1 is a block diagram showing the structure of a hierarchical transmission digital demodulator according to an embodiment of the invention.

Prior to describing the hierarchical transmission digital demodulator according to the embodiment of the invention, the structure of a frame used by the hierarchical transmission system will be described. FIG. 2(a) is a diagram showing an example of the frame structure used by the hierarchical transmission system. One frame is constituted of one header of 192 symbols and a plurality of pairs of 203 symbols and 4 symbols, totalling in 39936 symbols.

More specifically, one frame is constituted of: a frame syncpattern (BPSK) of 32 symbols; a transmission and multiplexing configuration control pattern (TMCC) (BPSK) of 128 symbols for transmission and multiplexing configuration identification; a super-frame identification information pattern of 32 symbols; a main signal (TC8PSK) of 203 symbols and a burst symbol signal (BPSK) of 4 symbols (indicated by BS in FIG. 2(a)); a main signal (TC8PSK) of 203 symbols and a burst symbol signal of 4 symbols; a main signal (QPSK) of 203 symbols and a burst symbol signal of 4 symbols; and a main signal (QPSK) of 203 symbols and a burst symbol signal of 4 symbols, respectively arranged in this order. 8 frames are called a super-frame and the super-frame identification information pattern is used for identifying the super-frame. 192 symbols from the frame sync pattern to the end of the super-frame identification information pattern is also called the header.

Next, the hierarchical transmission digital demodulator according to the embodiment of the invention will be described. The hierarchical transmission digital demodulator has an arithmetic circuit 1, a numerical control oscillator 2, a roll-off filer 3 composed of a digital filter having the raised cosine characteristics, a frame sync timing circuit 4, a transmission mode judging circuit 5, a carrier reproduction phase error detection circuit 6, a carrier filer 7 composed of a low-pass digital filter, a gain control circuit 8, an automatic frequency control (AFC) circuit 9, a CNR measuring circuit 10 and a logical gate circuit 11.

Figure 3:
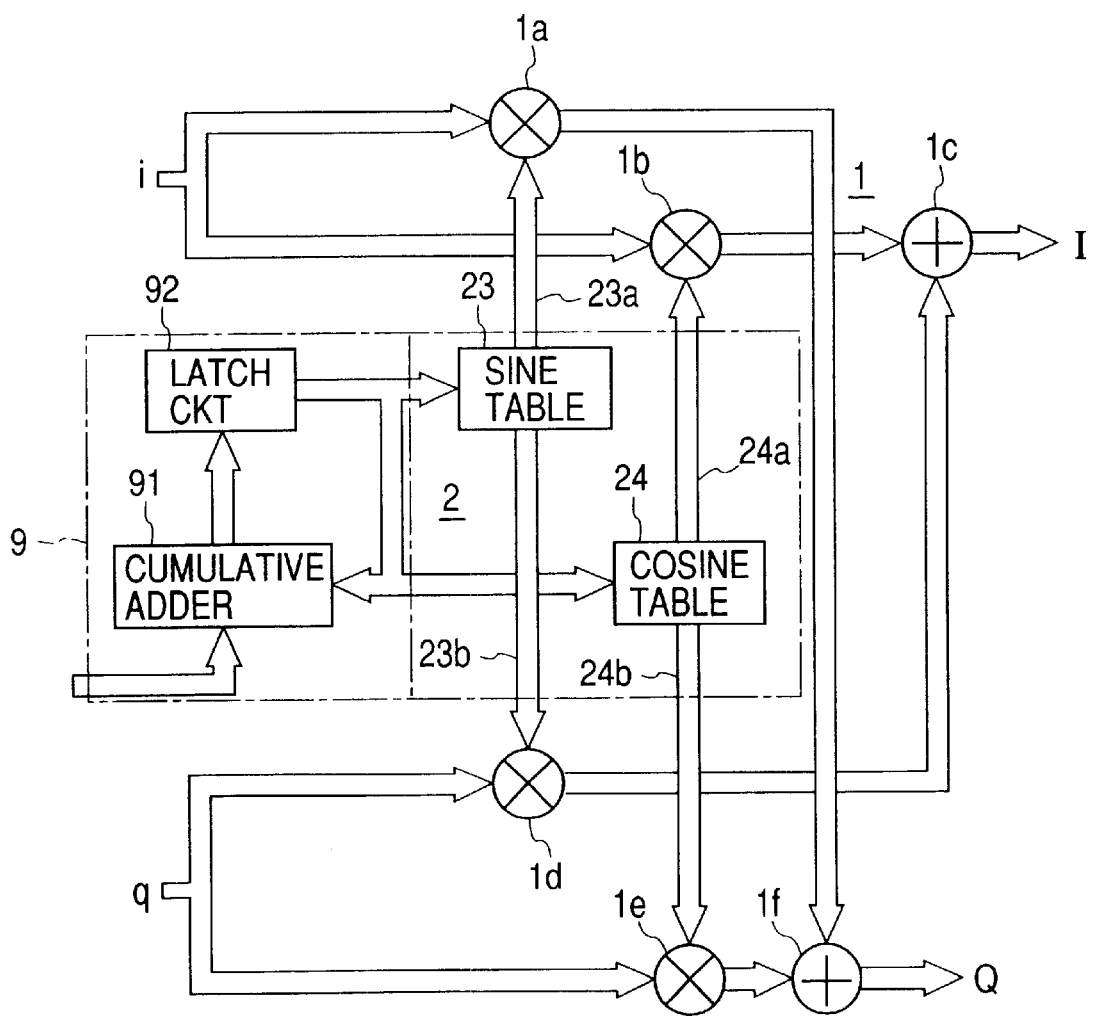
FIG. 3 is a block diagram showing the structures of an arithmetic circuit, a numerical control oscillator and an AFC circuit, respectively of the hierarchical transmission digital demodulator according to the embodiment of the invention.

As shown in FIG. 3, the AFC circuit 9 has a cumulative adder 91 and a latch circuit 92 which latches an output of the cumulative adder 91 and outputs it to the cumulative adder 91. As shown in FIG. 3, the numerical control oscillator 2 has a sine table 23 for receiving a latch output from the latch circuit 92 to output sine data 23a and 23b of opposite polarities and a cosine table 24 for receiving the latch output from the latch circuit 92 to output cosine data 24a and 24b. In accordance with the output from the latch circuit 92, the numerical control oscillator 2 outputs the sine data 23a and 23b and cosine data 24a and 24b of opposite polarities, to output sine and cosine signals of opposite polarities which substantially form a reproduction carrier in cooperation with the AFC circuit 9.

The arithmetic circuit has, as shown in FIG. 3,: a multiplier 1a for multiplying a quasi-sync detected I axis baseband signal i by the sine data 23a; a multiplier 1b for multiplying the baseband signal i by the cosine data 24a; a multiplier 1d for multiplying a quasi-sync detected Q axis baseband signal q by the opposite polarity sine data 23b; a multiplier 1e for multiplying the baseband signal q by the cosine data 24b; an adder 1c for adding outputs of the multipliers 1b and 1d to output the addition result as a baseband signal I, and an adder 1f for adding outputs of the multipliers 1a and 1e to output the addition result as a baseband signal Q. The arithmetic circuit 1 therefore tunes the frequencies of the baseband signals i and q and outputs the frequency tuned baseband signals I and Q to the roll-off filter 3.

Upon reception of baseband signals ID and QD output from the roll-off filter 3, the frame sync timing circuit 4 outputs a TMCC pattern to the transmission mode judging circuit 5. In accordance with the decoded result of the TMCC pattern, the transmission mode judging circuit 5 supplies the frame sync timing circuit 4 with a 2-bit transmission mode signal shown in FIG. 4 and representing a hierarchical combination of: an 8PSK signal which is a high hierarchical signal (demodulation output that the 8PSK modulated signal is demodulated is referred to as an 8PSK signal); a QPSK signal which is a low hierarchical (demodulation output that the QPSK modulated signal is demodulated is referred to as a QPSK signal); the 8PSK signal and QPSK signal; and the 8PSK signal and BPSK signal (demodulation output that the BPSK modulated signal is demodulated is referred to as a BPSK signal).

As shown in FIG. 4, the transmission mode signal takes a value "00" for the 8PSK signal, a value "01" for the QPSK signal, a value "10" for the 8PSK signal and QPSK signal, and a value "11" for the 8PSK signal and BPSK signal.

The frame sync timing circuit 4 receives the baseband signals ID and QD to detect a sync pattern and output a frame sync signal FSYNC, and also receives the transmission mode signal to output a signal $A_1$ shown in FIG. 2(b) which takes a high level during the header section and burst symbol signal section, and a signal $A_0$ shown in FIG. 2(c) which takes high level during the QPSK signal section.

The carrier reproduction phase error detection circuit 6 receives the baseband signals ID and QD and signal $A_1$ and $A_0$ to detect a phase error and output a phase error voltage corresponding to the detected phase error. More specifically, the carrier reproduction phase error detection circuit 6 is provided with a phase error table for the BPSK signal shown in FIGS. 7(a) and (b), a phase error table for the QPSK signal shown in FIGS. 8(a) and 8(b), and a phase error table for the 8PSK signal shown in FIGS. 9(a) and 9(b). The carrier reproduction phase error detection circuit 6 judges the transmission mode in accordance with the signals $A_1$ and $A_0$, selects the phase error table in accordance with the judged transmission mode, obtains the phase from the signal point arrangement of the baseband signals ID and QD, and outputs a phase error voltage corresponding to the phase.

Figure 7A:
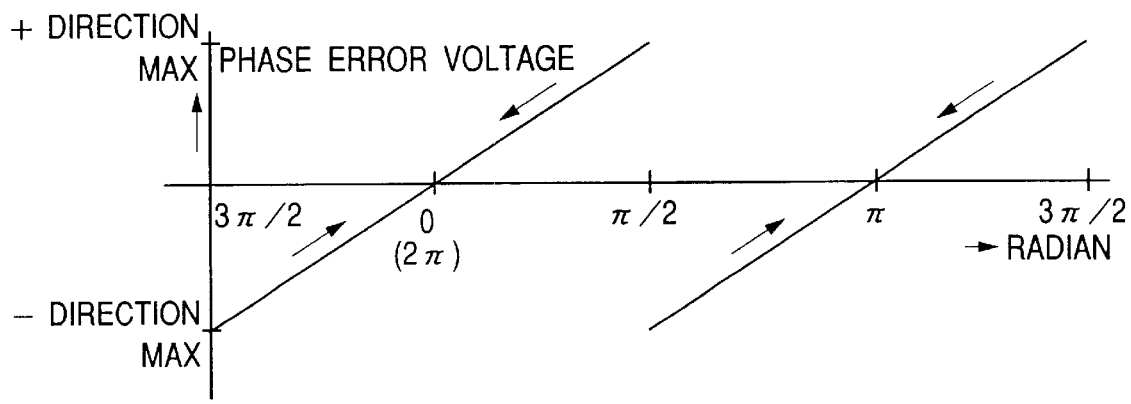
FIGS. 7(a) and 7(b) are a diagram illustrating a phase error table (for a BPSK signal) of the hierarchical transmission digital demodulator according to the embodiment of the invention.
Figure 7B:
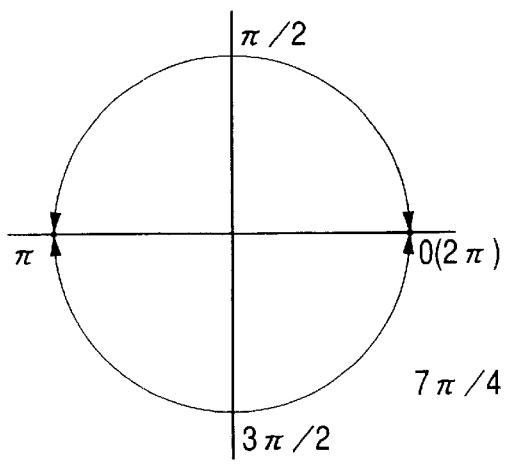

For example, if it is judged that the transmission mode corresponds to the BPSK signal (signals $A_1$ and $A_0$ are "1, 0") having the standard positions of the signal points at 0 ($2\pi$) radian and $\pi$ radian, then the carrier reproduction phase error detection circuit 6 selects the phase error table shown in FIGS. 7(a) and 7(b), and outputs: a negative phase error voltage shown in FIG. 7(a) for the phase in an increase direction in the range from the phase equal to or larger than $3\pi/2$ radian to the phase smaller than 0 ($2\pi$) radian; a positive phase error voltage shown in FIG. 7(a) for the phase in a decrease direction in the range from the phase smaller than π/2 radian to the phase larger than 0 (2π) radian; a negative phase error voltage shown in FIG. 7(a) for the phase in an increase direction in the range from the phase equal to or larger than π/2 radian to the phase smaller than π radian; and a positive phase error voltage shown in FIG. 7(a) for the phase in a decrease direction in the range from the phase smaller than 3π/2 radian to the phase larger than π radian. The phase error voltage takes the maximum value in the increase direction (+) at 3π/2 radian and the maximum value in the decrease direction (−) at π/2 radian.

Figure 8A:
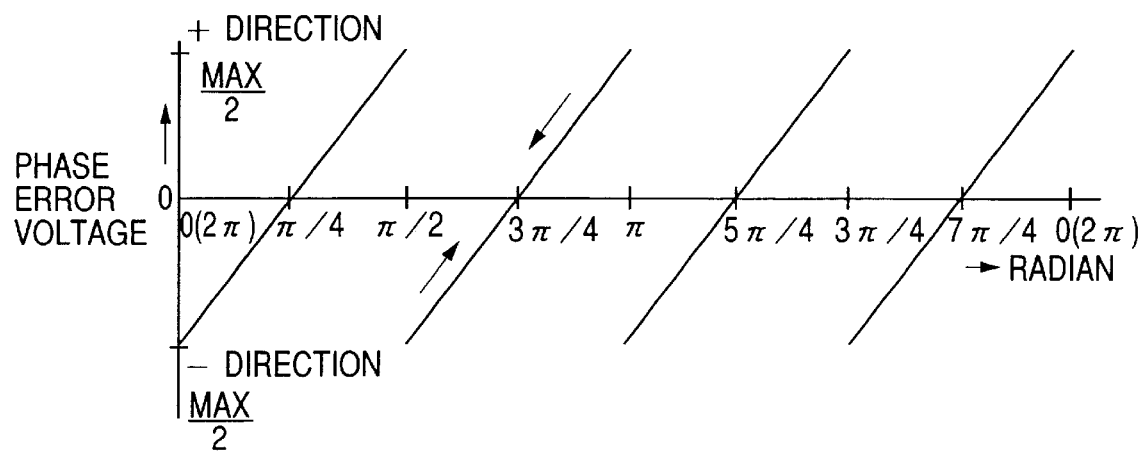
FIGS. 8(a) and 8(b) are a diagram illustrating a phase error table (for a QPSK signal) of the hierarchical transmission digital demodulator according to the embodiment of the invention.
Figure 8B:
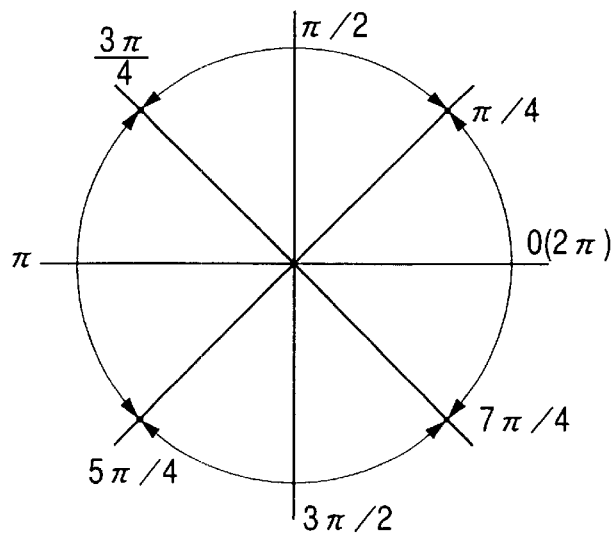

If it is judged that the transmission mode corresponds to the QPSK signal (signals $A_1$ and $A_0$ are "0, 1") having the standard positions of the signal points at π/4 radian, 3π/4 radian, 5π/4 radian and 7π/4 radian, then the carrier reproduction phase error detection circuit 6 selects the phase error table shown in FIGS. 8(a) and 8(b). In this case, the phase error voltage takes the + direction maximum value or − direction maximum value at the phase of 0 (2π) radian, π/2 radian, π radian or 3π/4 radian, the maximum value being a half of that of the BPSK signal. The description for the phase error voltage to be output when the transmission mode corresponds to the QPSK signal is omitted, since this can be easily understood from the description for the transmission mode for the BPSK signal.

Figure 9A:
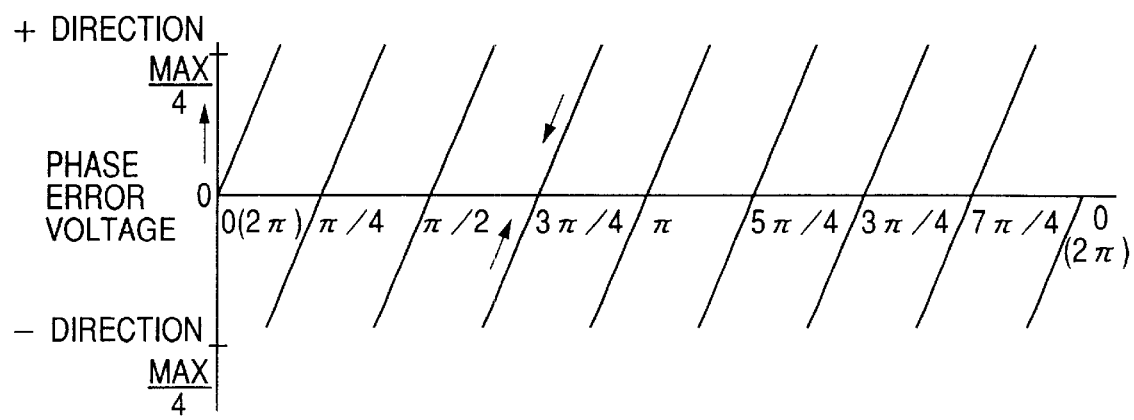
FIGS. 9(a) and 9(b) are a diagram illustrating a phase error table (for an 8PSK signal) of the hierarchical transmission digital demodulator according to the embodiment of the invention.
Figure 9B:
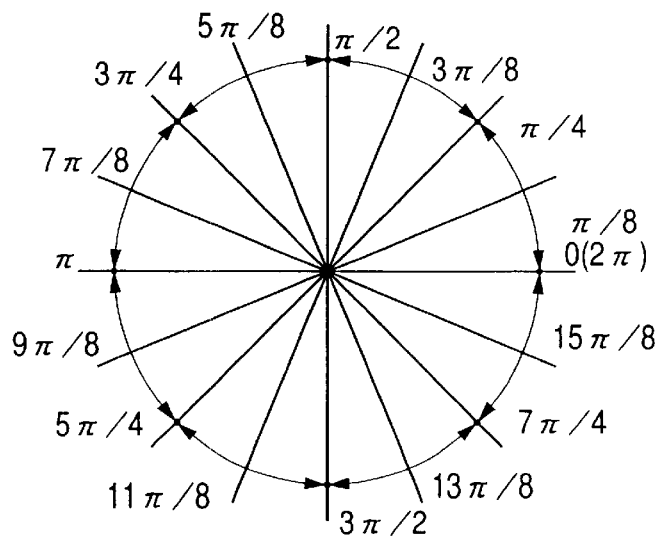

If it is judged that the transmission mode corresponds to the 8PSK signal (signals $A_1$ and $A_0$ are "0, 0") having the standard positions of the signal points at 0 (2π) radian, π/4 radian, π/2 radian, 3π/4 radian, π radian, 5π/4 radian, 3π/2 radian and 7π/4 radian, then the carrier reproduction phase error detection circuit 6 selects the phase error table shown in FIGS. 9(a) and 9(b). In this case, the phase error voltage takes the + direction maximum value or − direction maximum value at the phase of π/8 radian, 3π/8 radian, 5π/8 radian, 7π/8 radian, 9π/8 radian, 11π/8 radian, 13π/8 radian, or 15π/8 radian, the maximum value being a quarter of that of the BPSK signal. The description for the phase error voltage to be output when the transmission mode corresponds to the 8PSK signal is omitted, since this can be easily understood from the description for the transmission mode for the BPSK signal.

The phase error voltage output from the carrier reproduction phase error detection circuit 6 is supplied to the carrier filter 7 composed of a digital low-pass filter to smooth the phase error voltage. In this case, the filtering operation is selectively executed in accordance with the CNR code output from the logical gate circuit 11 to be described later and with a carrier filter control signal (CRFLGP) suitable for the mode identified by the signals $A_1$ and $A_0$.

An output of the carrier filter 7 is supplied to the gain control circuit 8 which controls the gain in accordance with a gain control signal (GCONT) output from the logical gate circuit 11 for each of a high C/N value and an intermediate C/N value. For example, as shown in FIG. 6, if the gain control signal (GCONT) takes a high potential, a high gain, such as a gain of amplifying the output of the carrier filter two times, is set, whereas if the gain control signal (GCONT) takes a low potential, a low gain, such as a unity gain of outputting the output of the carrier filter 7 as it is, is set. An output of the gain control circuit 8 is supplied to the AFC circuit. Namely, the output is supplied to the cumulative adder 91 of the AFC circuit 9 to add the output to a voltage value of the AFC circuit 9 which determines a scanning step frequency, so that a change in the oscillation frequency of the numerical control oscillator 2 is made faster.

Figure 10:
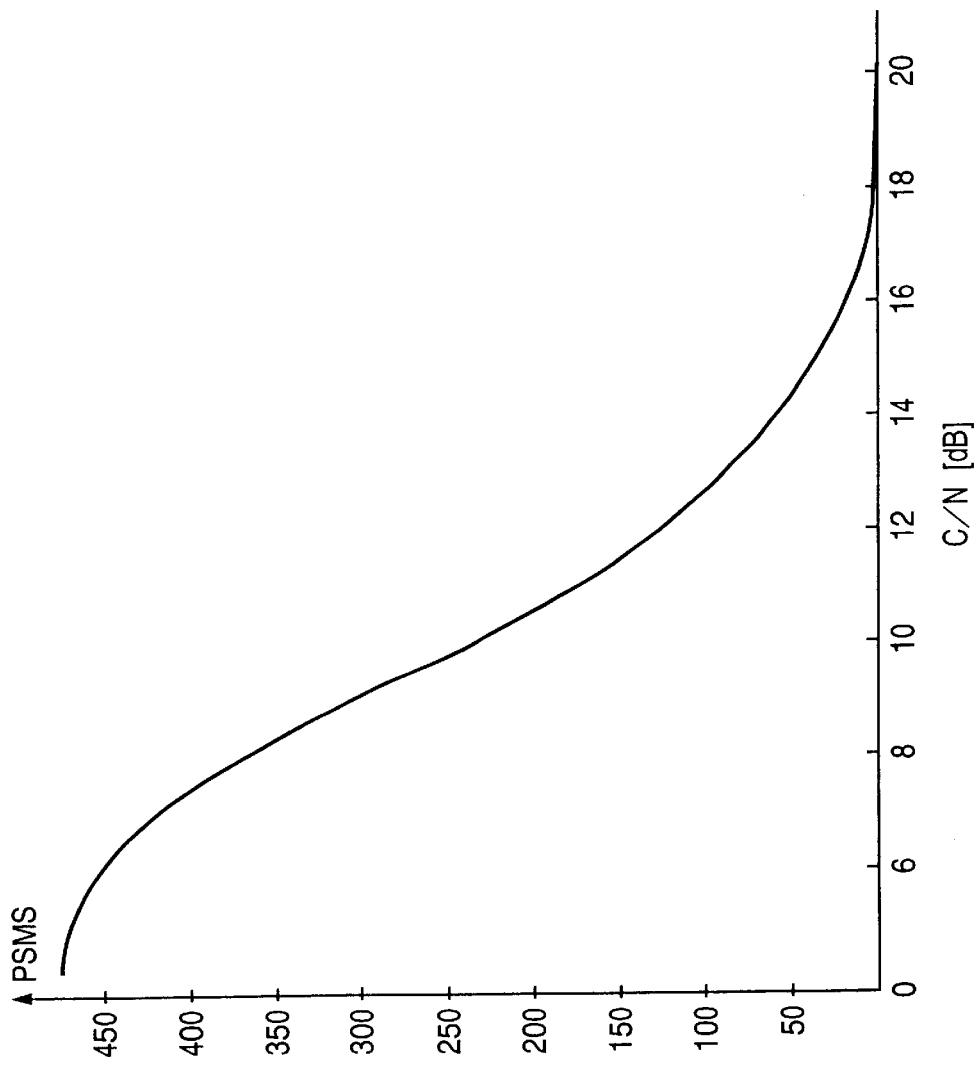
FIG. 10 is a characteristic diagram illustrating CNR measurements by the hierarchical transmission digital demodulator according to the embodiment of the invention.

The CNR measuring circuit 10 receives the baseband signals ID and QD, calculates a dispersion value of the signal point arrangement data obtained from the baseband signals ID and QD, compares the dispersion value with a predetermined threshold value, counts the number (DSMS) of occurrences of a dispersion value in excess of the threshold value per a predetermined unit time, and refers to a table shown in FIG. 10 formed through experiments by using the occurrence frequency (DSMS) as a search key to thereby obtain a C/N value which is output as a 2-bit CNR code. For example, as shown in FIG. 11, the CNR code takes a value "00" at a high CNR equal to or larger than 9 dB, a value "01" at an intermediate CNR equal to or larger than 4 dB and smaller than 9 dB, and a value "10" at a low CNR smaller than 4 dB.

The logical gate circuit 11 receives the signals $A_1$ and $A_0$ output from the frame sync timing circuit 4 and the CNR code output from the CNR measuring circuit 10, and outputs the carrier filter control signal (CRFLGP) and gain control signal (GCONT).

Figures 11, 12:
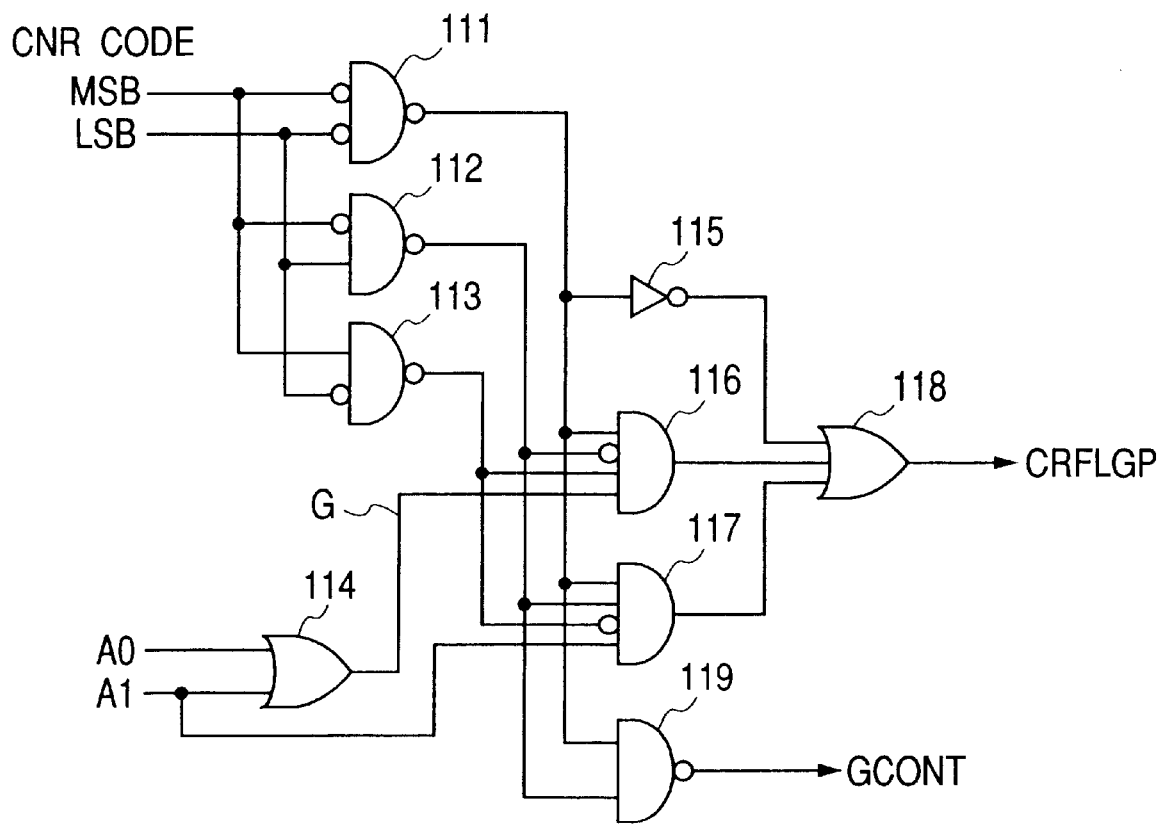
FIG. 11 is a diagram showing the relation between a CNR code output from a CNR measuring circuit and a C/N value of the hierarchical transmission digital demodulator according to the embodiment of the invention.
FIG. 12 is a block diagram showing a logical gate circuit of the hierarchical transmission digital demodulator according to the embodiment of the invention.

More specifically, as shown in FIG. 12, the logical gate circuit 11 has: NAND gates 111, 112 and 113 for receiving the CNR code and outputting signals corresponding to the high, intermediate and low C/N values, an OR gates 114 for receiving the signals $A_1$ and $A_0$ and outputting a signal G such as shown in FIG. 2(d) which takes a high potential in the sections of the BPSK signal, burst symbol signal and QPSK signal; an inverter 115 for outputting a high potential signal at the high C/N value; a NAND gate 116 for outputting the signal G at the intermediate C/N value; a NAND gate 117 for outputting the signal $A_1$ at the low C/N value; an OR gate 118 for receiving the outputs from the inverter 115 and NAND gates 116 and 117 and outputting the carrier filter control signal (CRFLGP); and a NAND gate 119 for outputting the high potential gain control signal (GCONT) at the high or low CNR.

At the high C/N value, the logical gate circuit 11 outputs the high potential carrier filter control signal (CRFLGP) irrespective of the discriminated mode (in any section of the header, burst symbol signal, QPSK signal and 8PSK signal), at the intermediate C/N it outputs the high potential carrier filter control signal (CRFLGP) in any section of the header, burst symbol signal and QPSK signal, and at the low C/N it outputs the high potential carrier filter control signal (CRFLGP) in any section of the header and burst symbol signal. In other cases, the low potential carrier filter control signal (CRFLGP) is output. The logical gate circuit 11 also outputs the high potential gain control signal (GCONT) at the high or intermediate C/N, and the low potential gain control signal at the low C/N.

When the high potential carrier filter control signal (CRFLGP) is output, the carrier filter 8 executes a filtering operation to smooth and output the phase error voltage. When the low potential carrier filter control signal (CRFLGP) is output, the carrier filter 8 stops the filtering operation so that the output immediately before the stop is held and output. When the high potential gain control signal (GCONT) is output, the gain control circuit 8 amplifies the output of the carrier filter 7 two times and outputs it. When the low potential gain control signal (GCONT) is output, the gain control circuit 8 outputs the output of the carrier filter 7 as it is.

In the hierarchical transmission digital demodulator of this invention constructed as above, the baseband signals i and q are multiplied by the arithmetic circuit 1 by the orthogonal reproduction carriers output from the numerical control oscillator 2 so that the frequencies of the baseband signals i and q are tuned and the baseband signals are supplied as the baseband signals ID and QD to the frame sync timing circuit 4 via the roll-off filter 3. The frame sync timing circuit 4 supplies the TMCC pattern to the transmission mode judging circuit 5 which decodes the TMCC pattern to supply the transmission mode signal to the frame sync timing circuit 4.

Upon reception of the baseband signals ID and QD and transmission mode signal, the frame sync timing circuit 4 detects the frame sync pattern and outputs the frame sync signal SYNC and signals $A_1$ and $A_0$. The frame sync signal SYNC is supplied to the gain control circuit 8 so that each time the frame sync is detected, the operation of the gain control circuit 8 is reset. The signals $A_1$ and $A_0$ are supplied to the carrier reproduction phase error detection circuit 6 and logical gate circuit 11.

Upon reception of the baseband signals ID and QD and signals $A_1$ and $A_0$, the carrier reproduction phase error detection circuit 6 selects a proper phase error table in accordance with the baseband signals and signals $A_1$ and $A_0$ to detect the phase error voltage which is supplied to the carrier filter 7 to be smoothed. Upon reception of the baseband signals ID and QD, the CNR measuring circuit 10 counts the number DSMS in accordance with the signal point arrangement of the baseband signals ID and QD. In accordance with the counted DSMS, the C/N value is obtained and output as the CNR code.

Upon reception of the CNR code and signals $A_1$ and $A_0$, the logical gate circuit 11 checks whether the C/N value is the high, intermediate or low C/N value. If the C/N value is either the high or intermediate C/N value, the gain control signal (GCONT) is supplied to the gain control circuit 8 to set the high loop gain of the gain control circuit 8 so that the phase error voltage output from the carrier filter 7 is amplified two times and output. If the logical gate circuit 11 judges the C/N value as the low C/N value, the gain control signal (GCONT) controls the gain control circuit 8 to take a low loop gain so that the phase error voltage output from the carrier filter 7 is output as it is.

Upon reception of an output from the gain control circuit 8, the cumulative adder 91 of the AFC circuit 9 cumulatively adds the output voltage of the gain control circuit 8 to the voltage value generated by the AFC circuit which voltage value determines the scanning step frequency. Therefore, the oscillation frequency of the numerical control oscillator 2 is changed so that the frequency scanning width is changed and then reproduction carrier frequency is changed.

Figure 13:
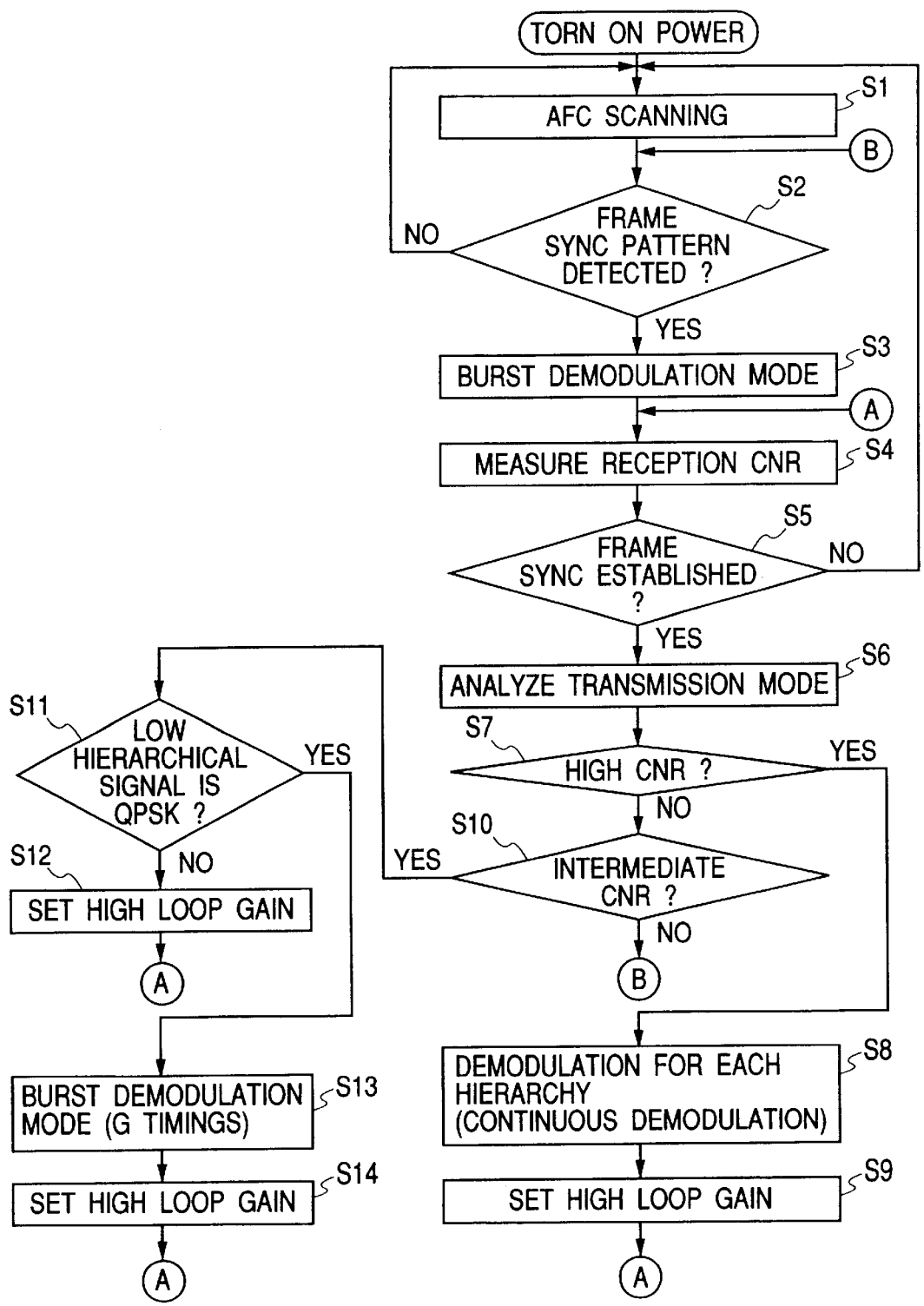
FIG. 13 is a flow chart illustrating the operation of the hierarchical transmission digital demodulator according to the embodiment of the invention.

Next, the operation of the hierarchical transmission digital demodulator of this invention constructed as above will be described with reference to the flow chart of FIG. 13.

As the power is turned on, the AFC circuit 9 scans the frequency to change the reproduction carrier frequency (Step S1), and this frequency scan at Step S1 continues until a frame sync pattern is detected (Step S2). When the frame sync pattern is detected, a burst demodulation mode starts demodulating the BPSK signal and burst symbol signal (Step S3). After Step S3, reception C/N is measured (Step S4).

After the reception C/N value is measured at Step S4, it is checked whether the frame sync signal FSYNC is detected a plurality of times in succession (Step S5). If the frame sync signal FSYNC is not detected a plurality of times in succession, it is judged that the frame sync is not established and the flow returns to Step S1 to repeat the above operations. If the frame sync signal FSYNC is detected a plurality of times in succession, after Step S5 the transmission mode is analyzed in accordance with a decode output of the TMCC pattern (Step S6).

After Step S6 it is checked whether the reception C/N value takes a high C/N value (Step S7). If it is judged at Step S7 that the reception C/N value takes the high C/N value, demodulation for each hierarchy or continuous demodulation is performed (Step SB). Next, the gain of the gain control circuit 8 is set to a high loop gain (Step S9) to thereafter return to Step S4 to repeat the above operations.

At Steps S7 to S9, a high potential signal output from the inverter 115 is output as the carrier filter control signal (CRFLGP) so that the carrier filter 7 is controlled to be in an operation state to sequentially demodulate the sections of the header, burst symbol signal, QPSK signal and 8PSK signal in this input order. In this case, the NAND gate 119 outputs a high potential signal as the gain control signal (GCONT) so that the gain control circuit is controlled to be in a high gain state.

If it is judged at Step S7 that the reception C/N value is not the high C/N value, it is then judged whether the reception C/N value is an intermediate C/N value or not (Step S10). If it is judged at Step S10 that the reception value is not the intermediate C/N value, the flow reruns to Step S2 to repeat the above operations. If it is judged at Step S10 that the reception value is not the intermediate C/N value, it means the low C/N value so that the NAND gate 119 outputs a low potential signal as the gain control signal (GCONT) to control the gain control circuit 8 to be in a low gain state.

Also, in the state of the low C/N value, a high potential signal is output from the NAND gate 117 as the carrier filter control signal (CRFLGP) to control the carrier filter 7 to be in an operation state. Therefore, in response to an output from the carrier filter 7, the sections of the header and burst symbol signal, i.e., the sections of the BPSK signal (including the burst symbol signal), are demodulated.

If it is judged at Step S10 that the reception C/N value is the intermediate C/N value, it is checked whether the low hierarchical signal is the QPSK signal or not (Step S11). If it is judged at Step S11 that the low hierarchical signal is the QPSK signal, a high potential signal is output from the NAND gate 116 as the carrier filter control signal (CRFLGP) to control the carrier filter 7 to be in an operation state. In response to the output from the carrier filer 7 in the operation state, the sections of the header, burst symbol signal and QPSK signal, i.e., the sections of the G timing shown in FIG. 2(d), are sequentially demodulated (Step S13).

After Step S13, a high potential signal is output from the NAND gate 119 as the gain control signal (GCONT) to control the gain control circuit 8 to be in a high gain state to thereafter return to Step S4 to repeat the above operations (Step S14).

If it is judged at Step S11 that the low hierarchical signal is not the QPSK signal, it means the 8PSK signal. Therefore, the OR gate 118 outputs a low potential signal as the carrier filter control signal (CRFLGP) to stop the operation of the carrier filter, and a high potential signal is output from the NAND gate 119 as the gain control signal (GCONT) to control the gain control circuit 8 to be in a high gain state to thereafter return to Step S4 to repeat the above operations (Step S12).

As described so far, according to the hierarchical transmission digital demodulator of the embodiment of the invention, during the period until sync capture is established, the carrier is reproduced in accordance with the demodulation output for the sections of the header and burst symbol signal. Therefore, carrier can be reproduced with reliable and good sync capture performance. If after the sync capture, the reception C/N value measured by the CNR measuring circuit 10 is high, the carrier is demodulated in accordance with a continuous demodulation output. Therefore, it is possible to prevent jitters from being generated by frequency variation while the carrier filter is held in suspension during the burst demodulation mode. If after the sync capture, the reception C/N value is intermediate, the carrier is demodulated in accordance with the demodulation output of the hierarchy signals except the 8PSK signal. Therefore, the carrier can be reproduced stably in accordance with the main signal (QPSK).

According to the hierarchical transmission digital demodulator of the embodiment of the invention, different carrier reproduction loop characteristics are used being switched between the carrier reproduction before and after the sync capture. The carrier can therefore be reproduced properly, stably and reliably.

INDUSTRIAL APPLICABILITY OF THE INVENTION

As described so far, according to the hierarchical transmission digital demodulator of the invention, during the period until frame sync is captured, a reliable carrier reproduction is possible, and after the frame sync is captured, the carrier is reproduced at a high C/N value in accordance with the continuous demodulation output. It is therefore possible to prevent jitters from being generated. If the C/N value is intermediate after the frame sync is captured, the carrier is reproduced in accordance with the demodulation output for hierarchical signals except the high hierarchical signal. It is therefore possible to reproduce the carrier for the necessary hierarchical signals stably without jitters.

What is claimed is:

1. A hierarchical transmission demodulator comprising: first carrier reproducing means for reproducing a carrier in accordance with demodulation outputs that a modulated wave in for a header section and a modulated wave of a burst symbol signal are demodulated; C/N measuring means for measuring a reception C/N value; second carrier reproducing means for reproducing the carrier in accordance with the demodulation outputs if the measured reception C/N value after sync capture is equal to or larger than a first predetermined threshold; and third carrier reproducing means for reproducing the carrier in accordance with demodulation signals at a hierarchical level except a high hierarchical level if the measured reception C/N value after the sync capture is equal to or larger than a second threshold which is lower than the first threshold.

2. A hierarchical transmission digital demodulator according to claim 1, further comprising reproduction loop characteristic switching means for switching a carrier reproduction characteristic to a different carrier reproduction characteristics during a carrier reproduction by said first carrier reproducing means and during carrier reproduction by the carrier reproducing means different from said first carrier reproducing means.

3. A hierarchical transmission digital demodulator for reproducing a carrier by demodulating a modulation wave, which is obtained by modulating a digital signal with different modulation methods associated with respective different necessary C/N values to generate a plurality of different modulated signals and multiplexing the modulated signals on a time axis, wherein the carrier is reproduced after a sync capture in accordance with a demodulation output corresponding to the modulated signal associated with a measured C/N value after sync capture measured by C/N measuring means for measuring a reception C/N value.

* * * * *